United States Patent
Tsuchitoi

(10) Patent No.: US 8,643,867 B2
(45) Date of Patent: Feb. 4, 2014

(54) IMAGE FORMING APPARATUS, PRINTING CONTROL METHOD, RECORDING MEDIUM, AND DATA SIGNAL

(75) Inventor: Yuki Tsuchitoi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1602 days.

(21) Appl. No.: 11/621,271

(22) Filed: Jan. 9, 2007

(65) Prior Publication Data

US 2007/0211294 A1 Sep. 13, 2007

(30) Foreign Application Priority Data

Mar. 7, 2006 (JP) ................................. 2006-061703

(51) Int. Cl.
*G06F 3/12* (2006.01)
*G06F 15/00* (2006.01)
*G06K 1/00* (2006.01)

(52) U.S. Cl.
USPC ............................ 358/1.15; 358/1.9; 358/1.13

(58) Field of Classification Search
USPC ......................................... 358/1.9, 1.13, 3.28
See application file for complete search history.

(56) References Cited

U.S. PATENT DOCUMENTS

| | | | | |
|---|---|---|---|---|
| 2001/0031065 A1* | 10/2001 | Rhoads | ......................... | 382/100 |
| 2002/0145759 A1* | 10/2002 | Miller | ......................... | 358/3.28 |
| 2004/0125402 A1* | 7/2004 | Kanai et al. | .................. | 358/1.15 |
| 2005/0007632 A1* | 1/2005 | Miyazaki et al. | ............ | 358/1.18 |
| 2006/0015734 A1* | 1/2006 | Atobe | ........................... | 713/176 |
| 2006/0114497 A1* | 6/2006 | Anderson et al. | ............ | 358/1.15 |

FOREIGN PATENT DOCUMENTS

JP 2003001905 1/2003

* cited by examiner

*Primary Examiner* — Ming Hon
(74) *Attorney, Agent, or Firm* — Gesmer Updegrove LLP

(57) ABSTRACT

There is provided an image forming apparatus including an added image detecting section that detects added image data contained in image data by analyzing input image data to be printed; an added image determination section that, when added image data is detected by the added image detecting section, determines whether the detected added image data corresponds to any post-processing on a post-processing apparatus which applies post-processing to a printing medium which has been subjected to printing; an image forming section that forms a printed image with the added image data removed from image data to be printed if the added image determination section determines that the added image data corresponds to post-processing on the post-processing apparatus; and a post-processing controller that instructs the post-processing apparatus to apply the post-processing for the added image data if the added image determination section determines that the added image data corresponds to post-processing on the post-processing apparatus.

6 Claims, 4 Drawing Sheets

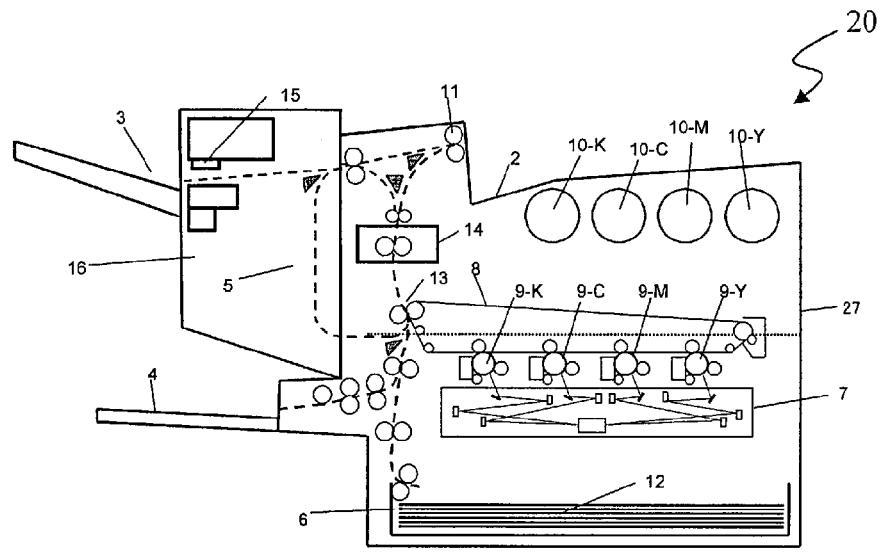

2: FACE-DOWN TRAY
3: FACE-UP TRAY
4: MANUAL PAPER FEEDING TRAY
5: DOUBLE-SIDE MODULE
6: PAPER FEEDING TRAY
7: ROS MODULE
8: INTERMEDIATE TRANSFER BELT
9-Y: YELLOW DRUM CARTRIDGE
9-M: MAGENTA DRUM CARTRIDGE
9-C: CYAN DRUM CARTRIDGE
9-K: BLACK DRUM CARTRIDGE
10-Y: YELLOW TONER CARTRIDGE
10-M: MAGENTA TONER CARTRIDGE
10-C: CYAN TONER CARTRIDGE
10-K: BLACK TONER CARTRIDGE
11: CLUTCH ROLLER
12: PRINTING PAPER
13: TRANSFER POSITION
14: FUSER UNIT
15: STAMP UNIT
16: POST-PROCESSING DEVICE
20: IMAGE FORMING APPARATUS
27: PRINTER

Fig. 2

IMAGE FORMING APPARATUS, PRINTING CONTROL METHOD, RECORDING MEDIUM, AND DATA SIGNAL

PRIORITY INFORMATION

This application claims priority to Japanese Patent Application No. 2006-061703 filed on Mar. 7, 2006.

BACKGROUND

1. Technical Field

The present invention relates to an image forming apparatus, and more particularly, to an image formation control apparatus and a printing control method for applying post-processing to a printing medium which has been subjected to printing using a post-processing apparatus, and to a recording medium and a data signal.

2. Related Art

As represented by PDF (Portable Document Format), which is a de facto standard, an electronic document can generally be formed with its image data hierarchically organized. Thus, by forming an added image such as an electronic seal on a layer (i.e., a level of hierarchy) different from that for the main body of an electronic document, the added image can be added to the main body of the electronic document such that the added image can be separated from the document. When an electronic document is formed in such a data structure, the main body of the electronic document (e.g., a certificate and an official document) can be displayed on a screen with an electronic seal put on it while ensuring its authenticity, which thus allows a user to visually confirm the printed image of the electronic document before printing it.

However, an added image such as an electronic seal is formed on a printing medium in an identical manner with the image of the main body of the electronic document. That is, the image of an authorized electronic seal that is printed with the main body of an electronic document cannot be distinguished from the image of an electronic seal that is illegally added on the main body of the electronic document and printed. Consequently, when an electronic seal is used, the authenticity of an electronic document can be confirmed on a display screen but cannot be ensured when the document is printed.

SUMMARY

The present invention is applied for performing control of printing of an added image to a printing medium that has already been subjected to printing, as well as control of execution of post-processing.

According to an aspect of the invention, there is provided an image forming apparatus including an added image detecting section that detects added image data contained in image data by analyzing input image data to be printed; an added image determination section that, when added image data is detected by the added image detecting section, determines whether the detected added image data corresponds to any post-processing on a post-processing apparatus which applies post-processing to a printing medium which has been subjected to printing; an image forming section that forms a printed image with added image data removed from image data to be printed if the added image determination section determines that the added image data corresponds to a post-processing on the post-processing apparatus; and a post-processing controller that instructs the post-processing apparatus to apply the post-processing for the added image data if the added image determination section determines that the added image data corresponds to post-processing on the post-processing apparatus.

BRIEF DESCRIPTION OF THE DRAWINGS

An exemplary embodiment of the present invention will be described in detail based on the following figures, wherein:

FIG. 2 shows the configurations of a printer and a post-processing apparatus in the image forming apparatus of the exemplary embodiment;

DETAILED DESCRIPTION

An exemplary embodiment of the present invention will be described below with respect to drawings.

Figure 1:
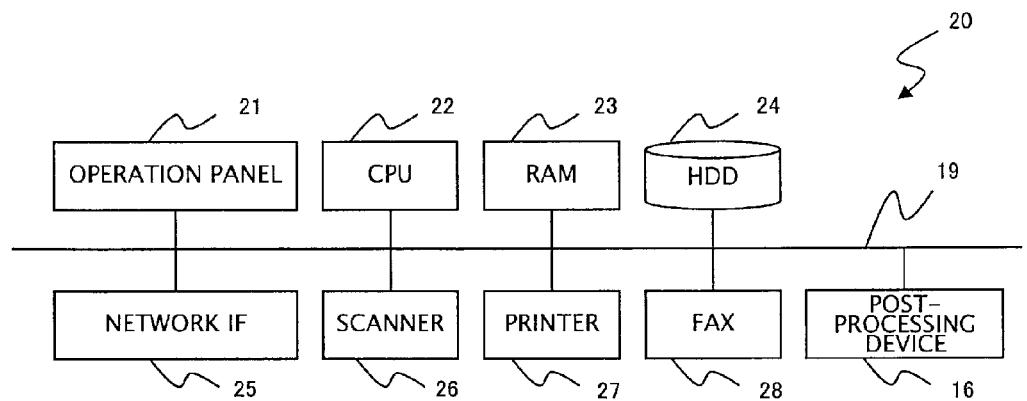
FIG. 1 shows the hardware configuration of an exemplary embodiment of the image forming apparatus according to the invention.

FIG. 1 illustrates the hardware configuration of an exemplary embodiment of the image forming apparatus according to the present invention. An image forming apparatus 20 is intended to be a multi-function machine that includes a scanner function, printing function, FAX function and the like, and its operation is controlled by a computer contained in the image forming apparatus 20. In FIG. 1, a CPU 22, RAM 23, and a HDD 24 which are contained in the computer, an operation panel 21 serving as a user interface of the computer, and a network interface (IF) 25 for external data exchange are connected to each other. Also included are a scanner 26, a printer 27, and a FAX 28 for realizing the functions mentioned above and a post-processing apparatus 16. These components are interconnected by an internal bus 19.

FIG. 2 shows configurations of the printer 27 and the post-processing apparatus 16 of the image forming apparatus 20 in the exemplary embodiment. As illustrated in FIG. 2, the image forming apparatus 20 includes the printer 27 that carries out printing by forming printed color images based on input image data and transferring the images onto sheet paper 12 as printing media and the post-processing apparatus 16 that applies post-processing to the sheet paper 12 that has been subjected to printing. The post-processing apparatus 16 of the exemplary embodiment includes a stamp unit 15 in which one or more stamps are set, capable of putting a stamp on the sheet paper 12. The post-processing apparatus 16 carries out the process of putting a stamp that is specified as post-processing on the sheet paper 12 in accordance with an instruction from a computer (not shown) included in the image forming apparatus. In terms of hardware, the image forming apparatus 20 of the exemplary embodiment can be realized by an existing apparatus.

Figure 3:
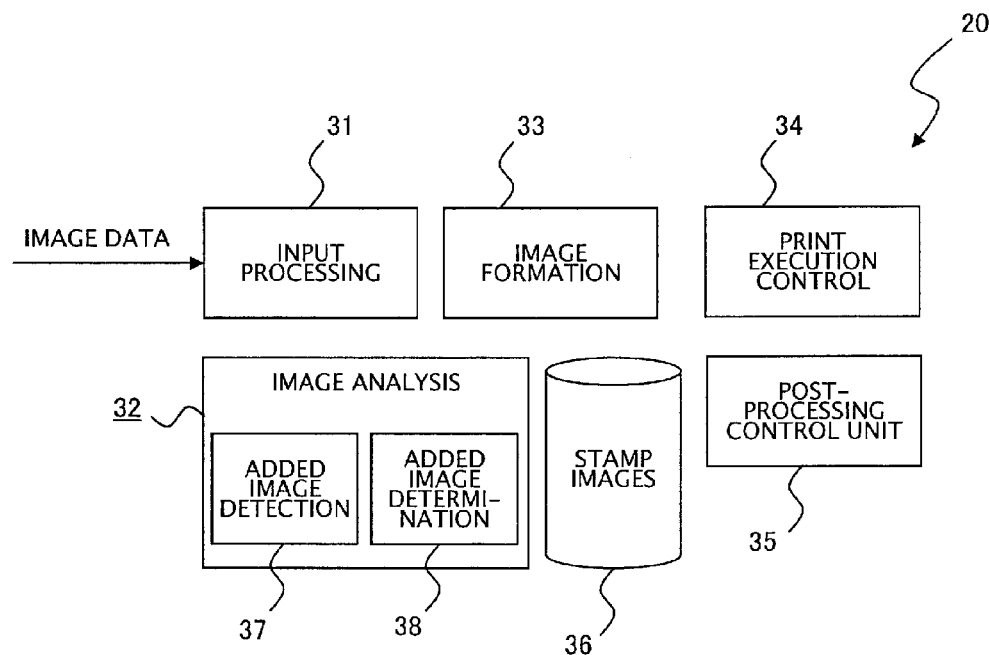
FIG. 3 is a block diagram of the image forming apparatus of the exemplary embodiment.

FIG. 3 shows a block diagram of the image forming apparatus 20 of the exemplary embodiment. The image forming apparatus 20 includes an input processing unit 31, an image analysis unit 32, an image forming unit 33, a printing execution control unit 34, a post-processing control unit 35, and a stamp image storage unit 36. The input processing unit 31 inputs data to be printed. Data to be printed can be input as data scanned in by a scanner, electronic data transmitted by a PC and the like and received via a network, or input data from a FAX line. The image analysis unit 32 has a function of analyzing image data to be printed. An added image detection unit 37 included in the image analysis unit 32 analyzes image data to be printed to thereby detect added image data contained in the image data. As will be further described below, added images assumed in this exemplary embodiment are imprint images of stamps that are put as added images by the post-processing apparatus 16 in the course of post-processing. The imprint images of stamps which are set in the stamp unit 15 of the post-processing apparatus 16 are registered previously in the stamp image storage unit 36. An added image determination unit 38 included in the image analysis unit 32 determines whether a stamp image, if any, detected by the added image detection unit 37 matches any one of stamp images registered in the stamp image storage unit 36. The image forming unit 33 forms printed images which will be transferred on the sheet paper 12 based on image data input by the input processing unit 31. The printing execution control unit 34 controls execution of printing such as transferring printed images formed by the image forming unit 33 onto the sheet paper 12, while controlling the operation of the components 2 to 14 included in the printer 27. The post-processing control unit 35 instructs the post-processing apparatus 16 on execution of post-processing according to results of comparison and matching at the added image determination unit 38.

The components 31 to 35 are realized through cooperative operation of devices such as the computer and the printer included in the image forming apparatus 20 and programs that run on a CPU that is contained in the computer.

Before describing a printing process in the exemplary embodiment, image data will be described first because the description of the exemplary embodiment here illustrates printing of image data that is sent over a network from a host computer, which is realized by a personal computer (PC) employed by a user.

Figure 4:
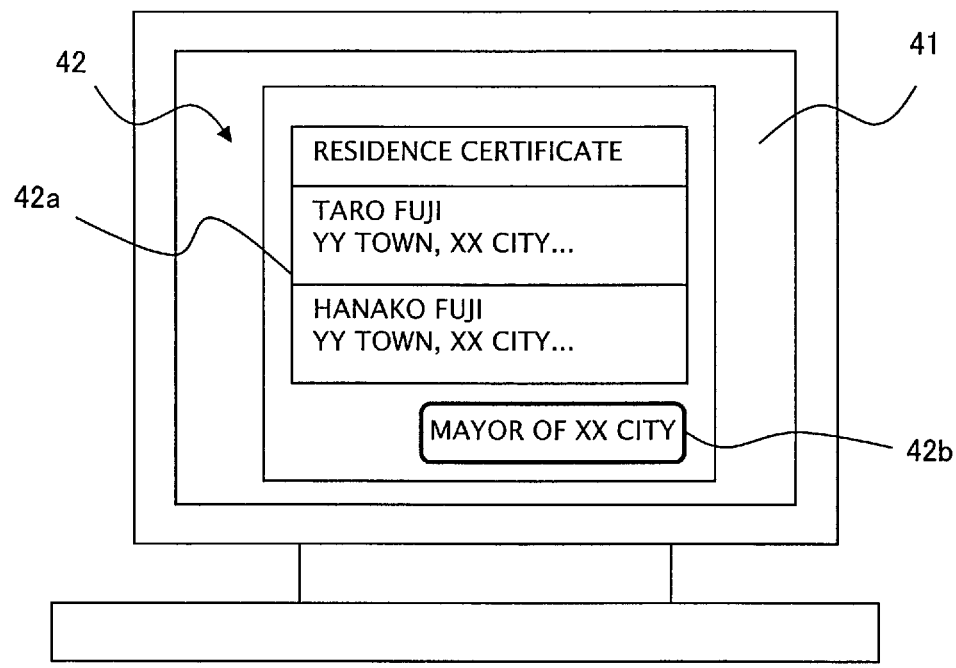
FIG. 4 illustrates an exemplary screen display of an electronic document on a display of the host computer in the exemplary embodiment.

FIG. 4 illustrates an exemplary screen display of an electronic document on the display of the host computer. An electronic document is shown on the display 41 as a printed image. An electronic document 42 shown in FIG. 4 consists of a main body 42a and an electronic seal 42b that is put on the main body 42a. Here, the data structure of the electronic document 42 will be described with reference to FIG. 5.

Figure 5:
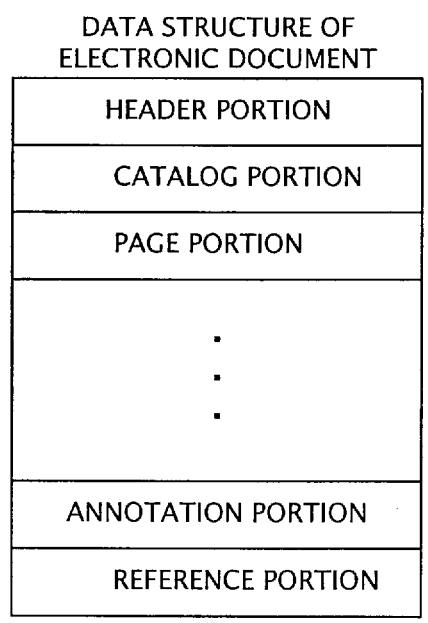
FIG. 5 shows an exemplary data structure of an electronic document used in the exemplary embodiment.

An electronic document consists of data portions shown in FIG. 5. In a header portion, information on the type of the electronic document is set. In a page portion, information on each page is set. Link information to images and/or annotations is also set in page portion. In the annotation portion, images as added images and text information are set. In a reference portion, offset information to each of the information portions is set.

An electronic document has such a structure and objects within the document can be accessed by making reference to the reference portion. As mentioned above, an electronic document can have image data hierarchically arranged. Image data representing the main body is stored in the page portion and added image data which is formed on a level different from the main body is stored in the annotation portion. Thus, image data and the like associated with the main body 42a of the electronic document 42 shown in FIG. 4 is contained in the page portion and image data and the like associated with the electronic seal 42b is contained in the annotation portion. Also, only the main body 42a represents the master.

Since an electronic document is structured as described above, it is possible to display or print only the main body with annotations removed as necessary. To remove annotations, when in display, settings are made in an application for displaying the electronic document, and when in printing, an operation such as instructing removal of annotations can be made in a printer driver. In addition, not only images but information on the images can be embedded as invisible information in annotations.

Figure 6:
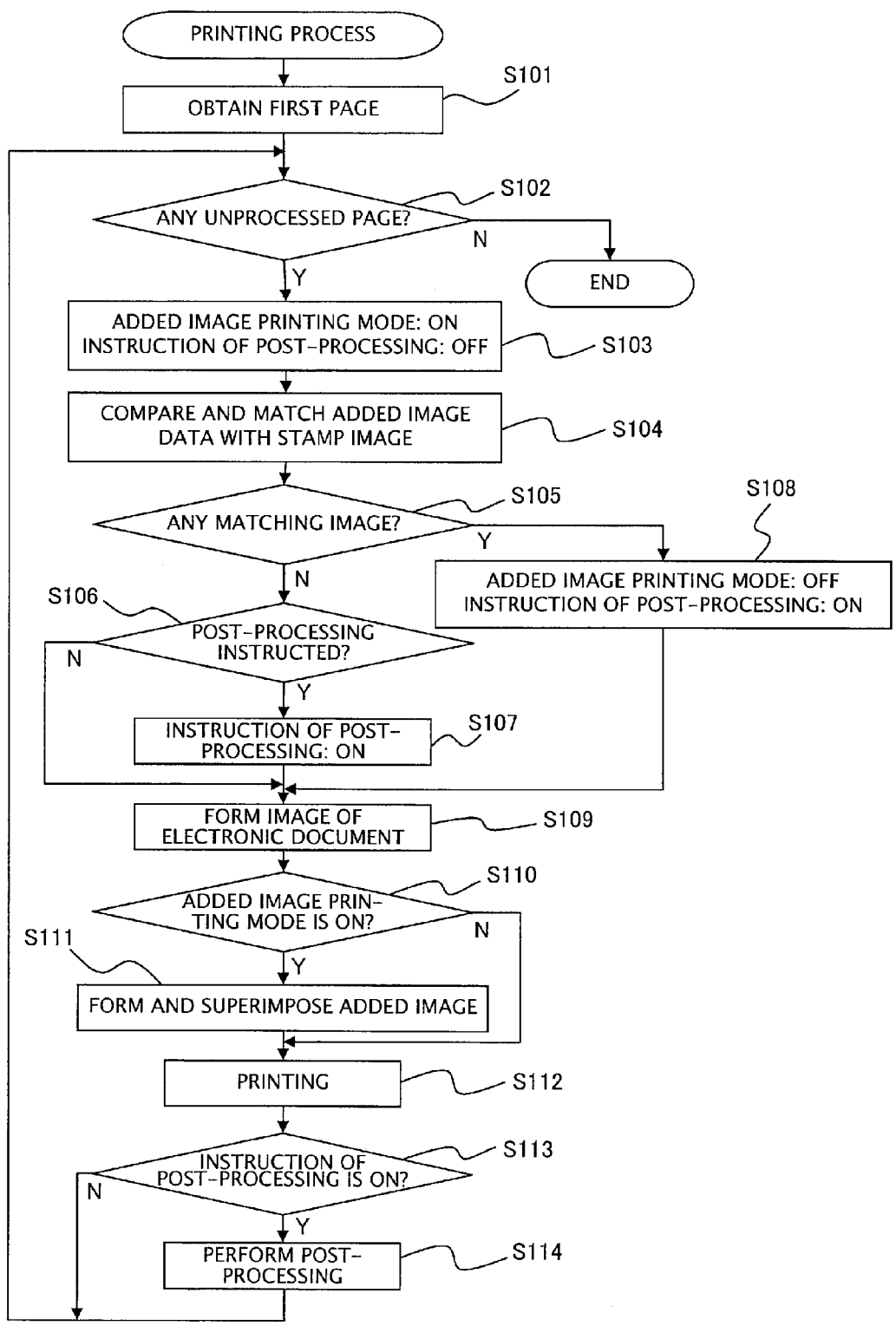
FIG. 6 is a flowchart illustrating printing process in the exemplary embodiment.

A printing process in the exemplary embodiment will be described with respect to the flowchart shown in FIG. 6.

The input processing unit 31 inputs image data for an electronic document to be printed sent from the host computer. Image data is generally sent in a data format called a page language. This is realized by converting data for each application to a page language appropriate for the printer supported by the printer driver on the host computer and sending the same. Some recent techniques directly analyze an electronic document and convert it into image data, not to a page language. In such a case, only image data can be transmitted to the image forming apparatus 20, or an electronic document can be transmitted with an instruction for printing called a job ticket to instruct stapling, double-sided and so forth.

The image data input by the input processing unit 31 is expanded into the RAM 23 as image data that can be output from the image forming apparatus 20. When the image data is used a number of times such as for collated output, the image data is temporarily stored in the HDD 24, from which the image data is expanded into the RAM 23 as necessary. Then, the image forming apparatus 20 performs the process described below from the start page to the last page (steps 101 and 102) in sequence.

First, added image printing mode is set to "ON" and instruction for post-processing is set to "OFF" as initial values (step 103). Added image printing mode is flag data that indicates whether to print an added image with the master or not. In the example of electronic document 42 illustrated in FIG. 4, this corresponds to whether or not to print the electronic seal "Mayor of XX City", where "ON" indicates to print it and "OFF" indicates not to print it. Instruction for post-processing is flag data that indicates whether to instruct application of post-processing at the post-processing apparatus 16 after printing to sheet paper 12. In the present example, this corresponds to whether or not to give an instruction to the post-processing apparatus 16 to put the stamp of "Mayor of XX City" contained in the stamp unit 15, where "ON" indicates to give the instruction and "OFF" indicates not to give the instruction.

The added image detection unit 37 of the image analysis unit 32 detects whether an image page to be processed contains an added image or not, and if there is an added image, extracts the added image. The added image detection unit 37 can detect an annotation by checking whether page data in question contains reference to the annotation portion. Then, the added image determination unit 38 compares and matches the added image (i.e., the electronic seal) which has been extracted through predetermined image analysis with imprint images of stamps registered in the stamp image storage unit 36 (step 104). If there is an imprint image of a stamp that matches the added image (i.e., the electronic seal) (Y at step 105), added image printing mode is set to "OFF" and instruction on post-processing is set to "ON" (step 108). This changes the initial settings to a setting for putting a stamp on sheet paper 12 without printing the electronic seal, which is an added image.

If there is no image of a stamp matching the added image (i.e., the electronic seal) (N at step 105), instruction for post-processing is set to "ON" if an instruction for post-processing is included in the electronic document in advance (steps 106 and 107).

The description above has mentioned that an added image (here, an electronic seal) is expanded into the RAM 23 as image data and determination is made as to whether the electronic seal matches any stamp by comparing and matching the image data with imprint image data for stamps registered in the stamp image storage unit 36. However, the determination may also be made based on information embedded in the electronic document 42 as invisible information, for example, instead of an added image itself. Invisible information can be embedded by putting a predefined keyword in an electronic document utilizing a comment in annotation data. For example, a keyword "stamp: Mayor of XX City" may be put in as a comment. Alternatively, a simple way for implementation this is use of a correspondence table, e.g., the first stamp is used when the keyword says "stamp: Mayor of XX City" and the second stamp is used when the keyword says "stamp: YY Section" and so on.

After setting whether the electronic seal should be printed on the electronic document and whether the electronic document should be subjected to post-processing, the image formation unit 33 forms the image of the main body of the electronic document, that is, the master portion (step 109). Then, if added image printing mode is set to "ON", an added image, that is, the image of the electronic seal, is formed and superimposed on the image of the main body (steps 110 and 111). The printing execution control unit 34 then carries out printing by controlling the operation of the printer 27 such as transferring the formed image onto sheet paper 12 (step 112).

After printing is carried out by the printer 27, if instruction on post-processing is set to "ON" (Y at step 113), the post-processing control unit 35 gives the post-processing apparatus 16 an instruction to apply post-processing. In response to the instruction, the post-processing apparatus 16 applies post-processing to the sheet paper 12 that is conveyed from the printer 27 (step 114). In this example, a stamp of "Mayor of XX City" specified by the post-processing control unit 35 is selected in the stamp unit 15 and put onto the conveyed sheet paper 12 which has been subjected to printing.

The description above mentioned that it is determined whether the main body of an electronic document has an added image in it by analyzing image data for the electronic document, and based on the result, necessity of post-processing is determined. However, in order to put a stamp in post-processing identically with an image displayed on the display 41 of the host computer, the image analysis unit 32 also obtains information on how an added image is added, such as the position of the added image in the main body of the electronic document and the color and shape of the added image, in addition to determining the presence of an added image. The post-processing control unit 35 includes the obtained information on addition into an instruction to be passed to the post-processing apparatus 16 so that the image forming apparatus 20 can print the electronic document in a form identical with the image displayed on the screen. Specifically, if an added image is added at the lower right to the main body, a stamp as post-processing is also put at the lower right to the main body. Alternatively, if the color of the added image is red, red stamp ink is used, and when the color of the image is black, black stamp ink is used.

Although the description of the exemplary embodiment has illustrated stamping as post-processing for ensuring the authenticity of an electronic document, processes such as stapling, punching and folding can also be applied as post-processing. Thus, if an added image associated with post-processing, e.g., an added image that is stapled with an electronic document, is added to an electronic document, control can be provided to form a printed image excluding the added image and apply post-processing corresponding to the added image.

In addition, although in the exemplary embodiment an instruction on post-processing is given to the post-processing apparatus 16 which is incorporated into the image forming apparatus 20, such an instruction for post-processing can be also given to the post-processing apparatus 16 that is provided as a separate apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
    an added annotation image detecting section that detects added annotation image data contained within image data to be printed by analyzing the image data to be printed, the added annotation image data having been added to master image data;
    an added image determination section that, when added annotation image data is detected by the added annotation image detecting section, determines whether the detected added annotation image data corresponds to post-processing on a post-processing apparatus which applies the post-processing to a printing medium which has been subjected to printing;
    an image forming section that forms a printed image corresponding to the master image data by removing the added annotation image data from image data to be printed if the added annotation image determination section determines that the added annotation image data corresponds to the post-processing; and
    a post-processing controller that instructs the post-processing apparatus to apply, to the printing medium which has been subjected to the prior printing process of the master image data, the post-processing for the added annotation image data if the added annotation image determination section determines that the added annotation image data corresponds to the post-processing.

2. The image forming apparatus according to claim 1, wherein the added annotation image detecting section obtains information on status of addition that includes at least the position of added annotation image data within image data to be printed, and the post-processing controller includes the status of addition obtained by the added annotation image detecting section into an instruction to the post-processing apparatus.

3. The image forming apparatus according to claim 1, wherein the added annotation image data is seal image data.

4. An image forming apparatus, comprising:
    an added annotation image detecting section that detects added annotation image data contained within image data to be printed by analyzing the image data to be printed, the added annotation image data having been added to master image data;

an added image determination section that, when added annotation image data is detected by the added annotation image detecting section, determines whether the detected added annotation image data corresponds to post-processing on a post-processing apparatus which applies the post-processing to a printing medium which has been subjected to printing;

an image forming section that forms a printed image corresponding to the master image data by removing the added annotation image data from image data to be printed if the added annotation image determination section determines that the added annotation image data corresponds to the post-processing; and a post-processing controller that instructs the post-processing apparatus to apply a process of forming an added annotation image that corresponds with the added annotation image data on a printing medium if the added annotation image determination section determines that the added annotation image data corresponds with an added image, the post-processing apparatus forming the added annotation image on the printing medium which has been subjected to the prior printing process of the master image data.

5. A printing control method that causes an image forming apparatus to which a post-processing apparatus is connected for applying post-processing to a printing medium which has been subjected to printing to execute processes, the processes comprising:

detecting added annotation image data contained within image data to be printed by analyzing the image data to be printed, the added annotation image data having been added to master image data;

when added image data is detected, determining whether the detected added annotation image data corresponds to post-processing on the post-processing apparatus; and if the detected added annotation image data is determined to correspond to post-processing on the post-processing apparatus, forming a printed image corresponding to the master image data by removing the added annotation image data from the image data to be printed and instructing the post-processing apparatus to apply the post-processing corresponding to the added annotation image data, the post-processing apparatus forming the added annotation image on the printing medium which has been subjected to the prior printing process of the master image data.

6. A non-transitory computer-readable recording medium storing a program causing a computer to execute a process, the process comprising detecting added annotation image data contained within image data to be printed by analyzing the image data to be printed, the added annotation image data having been added to master image data;

when added image data is detected, determining whether the detected added annotation image data corresponds to post-processing on the post-processing apparatus; and if the detected added annotation image data is determined to correspond to post-processing on the post-processing apparatus, forming a printed image corresponding to the master image data by removing the added annotation image data from the image data to be printed and instructing the post-processing apparatus to apply the post-processing corresponding to the added annotation image data, the post-processing apparatus forming the added annotation image on the printing medium which has been subjected to the prior printing process of the master image data.

* * * * *